United States Patent
Olson et al.

(10) Patent No.: US 9,437,233 B1
(45) Date of Patent: Sep. 6, 2016

(54) SELF-ASSEMBLED MONOLAYER TO ADJUST FLY HEIGHT

(71) Applicant: Seagate Technology LLC, Cupertino, CA (US)

(72) Inventors: Daniel W. Olson, Minneapolis, MN (US); Timothy W. Stoebe, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/877,292

(22) Filed: Oct. 7, 2015

(51) Int. Cl.
*G11B 5/60* (2006.01)
*G11B 5/40* (2006.01)

(52) U.S. Cl.
CPC .............. *G11B 5/60* (2013.01); *G11B 5/6005* (2013.01); *G11B 5/6011* (2013.01); *G11B 5/6035* (2013.01); *G11B 5/6082* (2013.01); *G11B 5/40* (2013.01)

(58) Field of Classification Search
None
See application file for complete search history.

(56) References Cited

U.S. PATENT DOCUMENTS

| | | | | |
|---|---|---|---|---|
| 6,359,746 | B1 * | 3/2002 | Kakekado | G11B 5/54 360/75 |
| 6,529,342 | B1 * | 3/2003 | Feng | G11B 5/6017 360/31 |
| 6,775,089 | B1 * | 8/2004 | Bonin | G11B 5/6017 360/75 |
| 6,967,805 | B1 * | 11/2005 | Hanchi | G11B 5/6005 360/75 |
| 7,450,333 | B2 * | 11/2008 | Hirano | G11B 5/6005 360/294.7 |
| 7,675,711 | B2 * | 3/2010 | Feng | G11B 5/60 360/125.71 |
| 7,719,786 | B1 | 5/2010 | Baumgart et al. | |
| 7,746,600 | B2 | 6/2010 | Hancer et al. | |
| 7,855,858 | B2 | 12/2010 | Hancer et al. | |
| 8,114,470 | B2 * | 2/2012 | Gao | G11B 5/66 427/131 |
| 8,995,076 | B1 | 3/2015 | Olson et al. | |
| 2002/0132083 | A1 * | 9/2002 | Weller | G11B 5/82 428/845.6 |
| 2004/0201926 | A1 * | 10/2004 | Hancer | G11B 5/5552 360/294.4 |
| 2005/0174665 | A1 * | 8/2005 | Zhang | G11B 5/40 360/25 |
| 2007/0042154 | A1 * | 2/2007 | Hancer | G11B 5/8408 428/64.1 |
| 2007/0127158 | A1 * | 6/2007 | Tran | G11B 5/718 360/134 |
| 2007/0196673 | A1 * | 8/2007 | Hancer | C10M 177/00 428/447 |
| 2008/0123214 | A1 * | 5/2008 | Zhu | G11B 5/6005 360/75 |
| 2012/0052329 | A1 * | 3/2012 | Gao | G11B 5/72 428/827 |
| 2014/0269838 | A1 | 9/2014 | Macken | |
| 2015/0002960 | A1 | 1/2015 | Stoebe et al. | |
| 2015/0015996 | A1 | 1/2015 | Rajasekharan et al. | |
| 2015/0103444 | A1 | 4/2015 | Kunkel et al. | |

* cited by examiner

*Primary Examiner* — Carlos E Garcia
(74) *Attorney, Agent, or Firm* — HolzerIPLaw, PC

(57) ABSTRACT

A disc drive assembly that includes a disc having a surface, a slider having an air-bearing surface (ABS) opposite the disc surface, and a voltage source for applying a voltage/potential across the disc and slider. Present on either the ABS or the disc surface is a surface treatment that provides a surface potential of at least +/−0.1 V. In some implementations the surface treatment is a self-assembled monolayer (SAM).

11 Claims, 3 Drawing Sheets

SELF-ASSEMBLED MONOLAYER TO ADJUST FLY HEIGHT

BACKGROUND

Hard disc drives are common information storage devices having a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out.

This position of the slider above the disc is known as the fly height or head-to-media spacing (HMS). As data densities on the disc increase, there is a desire to decrease the fly height or HMS in order to obtain a more efficient drive. However, physically irregularities are present in the disc, hindering the decrease of fly height or HMS.

SUMMARY

Generally, the present disclosure provides a methodology to adjust the fly height.

One particular implementation described herein is a disc drive assembly that includes a disc having a surface, a slider having an air-bearing surface (ABS) opposite the disc surface, and a voltage source for applying a voltage/potential across the disc and slider. Present on either the ABS or the disc surface is a surface treatment that changes the surface potential by at least +/−0.5 V.

Another particular implementation is a disc drive assembly that includes a disc having a surface, a slider having an air-bearing surface (ABS) opposite the disc surface, and a voltage source for applying a voltage/potential across the disc and slider. Present on either the ABS or the disc surface is a self-assembled monolayer (SAM) material. In some implementations, the SAM material changes the surface potential by at least +/−0.1 V.

Yet another particular implementation is a method of affecting a fly height of a slider above a disc. The method includes providing a self-assembled monolayer (SAM) material on either an air-bearing surface (ABS) of the slider or the disc; and applying a potential across the ABS and the disc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

As discussed above, hard disc drive assemblies include a slider that is designed and configured to ride over a magnetic data storage disc at a fly height or head-to-media spacing (HMS). Applying a voltage to either surface (i.e., the slider or the disc) causes electrostatic attraction between the head and disc that can be used to adjust the fly height or HMS and thus compensate for disc topography. However, it would be desired to be able to alter (e.g., increase) the electrostatic attraction from the voltage differential between the surfaces. Applying a self-assembled monolayer (SAM) to either surface changes the surface potential of that surface and thus the voltage differential; this change in the surface potential may be engineered to cause the same voltage range to provide a larger clearance change ("stroke") than if no SAM were present, thus increasing the range of media topography that can be mitigated to reduce HMS.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
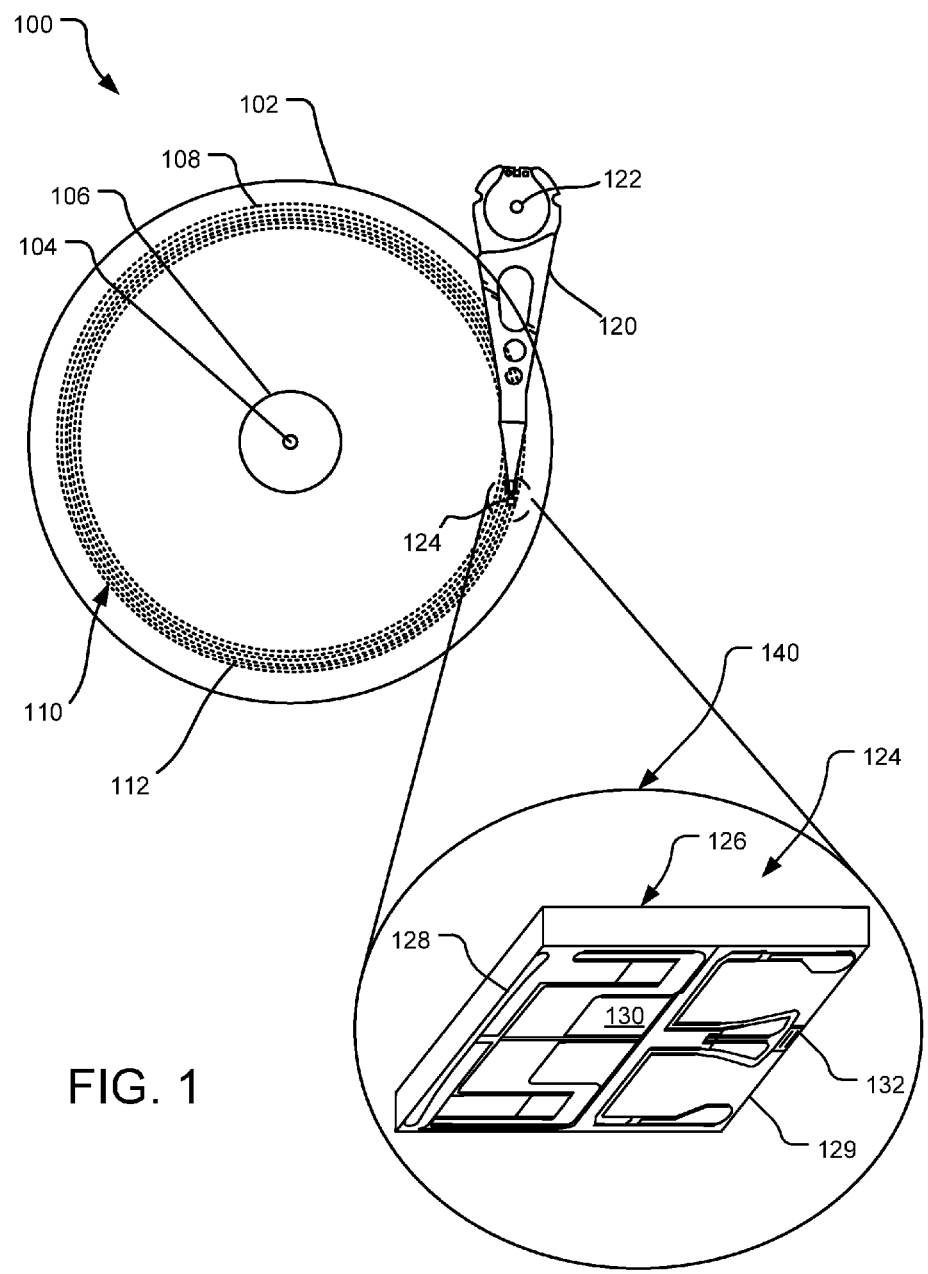
FIG. 1 is a schematic partial top view, partial perspective view of a disc drive assembly.

FIG. 1 illustrates a perspective view of an example recording device, or, disc drive assembly 100. Disc drive assembly 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced bits 112, indicated as dots on the disc 102. It should be understood, however, that the described technology may be employed with other types of storage media, including continuous magnetic media, discrete track (DT) media, etc.

Information may be written to and read from the bits 112 on the disc 102 in different data tracks 110. An actuator assembly 120 having an actuator axis of rotation 122 supports a slider 124 with a transducer in close proximity above the surface of the disc 102 during disc operation; not seen in FIG. 1, the slider 124 is connected to the actuator assembly 120 by a head-gimbal-assembly (HGA). The surface of the slider 124 closest to and opposite to the disc 102 is called the air-bearing surface (ABS). In use, the actuator assembly 120 rotates during a seek operation about the actuator axis of rotation 122 to position the slider 124 over a target data track 110. As the disc 102 spins, a layer of air forms between the slider 124 and the surface of the disc 102, resulting in the slider 124 'flying' above the disc 102. The transducer on the slider 124 then reads or writes data to the bits 112 in the target data track 110.

An exploded view 140 illustrates an expanded view of the slider 124. The slider 124 has a body 126 with a leading edge 128 and a trailing edge 129, with an air-bearing surface (ABS) 130 between the leading edge 128 and the trailing edge 129. The ABS 130 is the surface or face of the slider 124 positioned opposite the surface of the disc 102; that is, the ABS 130 is facing the disc 102. Not seen in this figure, opposite the ABS 130 is a back pad by which the slider 124 is connected to the HGA and the actuator assembly 120. A transducer 132 (which includes read/write head(s)) is located on, at or close to the trailing edge 129.

During use of disc drive assembly 100, for an accurate write operation to occur, it is desirable to have a relatively small distance or spacing between the write head and the disc 102. This distance or spacing is known as "fly height" or "head-to-media spacing" (HMS). By reducing the fly height, a read/write head is typically better able to both write data to and read data from the disc 102.

Reducing the fly height also allows surveying the topography of the disc 102, such as detecting irregularities, asperities and other features on the surface of the disc 102. In some implementations, unaccounted media topography may vary by as much as 6 to 8 Angstroms. Compensating for this topography reduces undesired head to disc contact, head wear and transducer performance degradation. Better topography compensation enables lower active clearance between the slider 124 and the disc 102, and thus enables higher recording density, improves reliability, and also reduces wear on both the slider 124 and the disc 102.

In some implementations the topography is determined by controlled contact between the slider 124 and the disc 102. Many contact detection schemes utilize a heater (not shown in FIG. 1) on the slider 124, which physically expands a portion of the slider towards the disc 102. These contact detection schemes involve determining the heater power necessary to cause sufficient thermal expansion of the slider 124 from a passive fly condition to intermittent head-disc contact. This intermittent contact may cause significant modulation of the slider fly height. The modulation of slider fly height then results in modulation of heat transfer between the slider and the disc. A thermal proximity sensor, e.g., a dual ended temperature coefficient of resistance (DETCR) sensor, can easily pick up these relatively large fluctuations in head-disc heat transfer. The readings from the thermal proximity sensor in combination with the heater power can be used to detect contact between the head and the disc.

As mentioned above, as the disc spins, a layer of air forms between the ABS of the slider and the surface of the disc, resulting in the slider 'flying' above the disc. This fly height depends on, e.g., the air bearing design as well as radius and skew conditions, the suspension torques, the topography of the ABS of the slider, the magnetic media topography, the rotation speed of the disc, environmental factors such as temperature and humidity, and also native electrostatic forces that inherently exist due to the slider flying over the disc surface.

Figure 2:
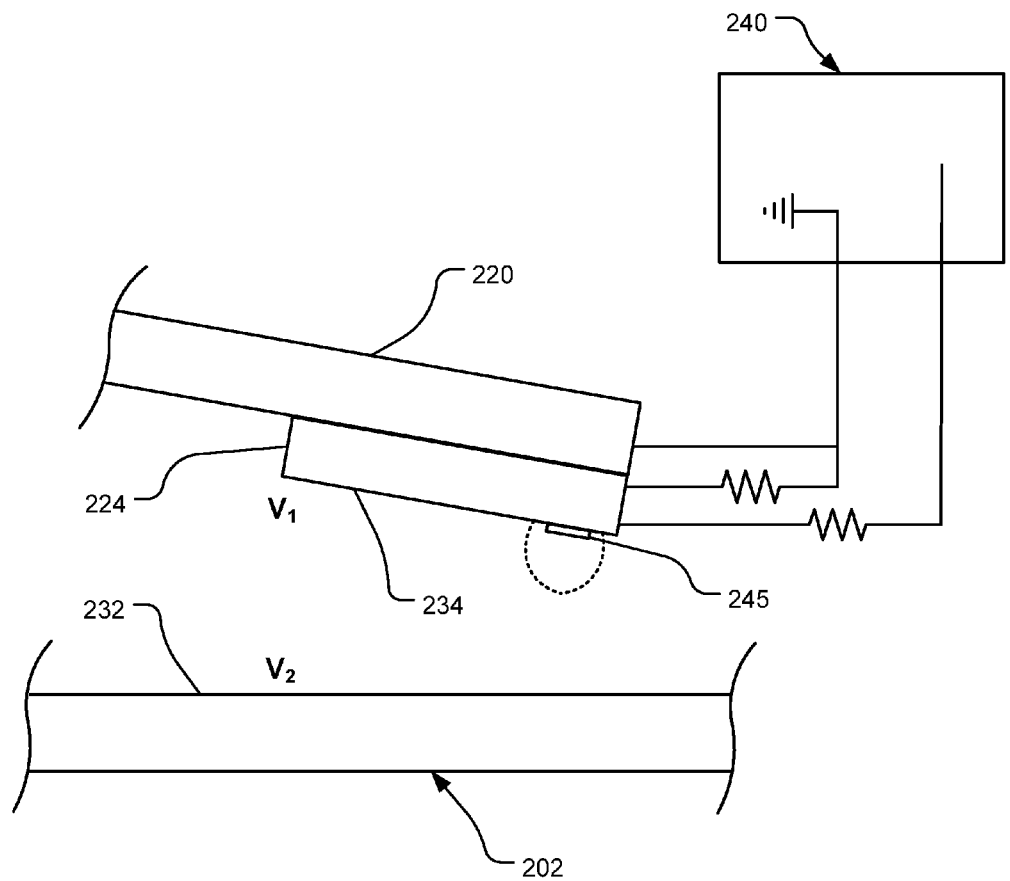
FIG. 2 is a schematic partial side view of a disc drive assembly.

FIG. 2 rudimentarily shows a disc 202 having a surface 232 and an actuator assembly 220 supporting a slider 224 that has an ABS surface 234. The ABS surface 234 has a voltage $V_1$ and the disc surface 332 has a voltage $V_2$. Either or both of $V_1$, $V_2$ may be negative or positive. The difference between $V_1$ and $V_2$ is the voltage potential, or, the voltage across the surfaces. A native voltage inherently exists across $V_1$ and $V_2$ merely due to the materials and operation of the slider 224 flying over the disc surface 232.

This native voltage may be augmented by applying additional voltage to, e.g., the slider 224, by a voltage source 240 (e.g., a pre-amplifier, or, pre-amp), which also grounds the actuator assembly 220, and which is insulated and electrically isolated from the slider 224. The voltage source 240 may provide, e.g., up to about 1 V (+/−), although typically it is less (e.g., 600 mV (+/−)) because as the available voltage increases so does the cost.

The voltage differential between $V_1$ and $V_2$, due to the native voltage and the voltage provided by the voltage source 240, can be used to adjust (modify) the height of the slider 224 above the disc surface 232. That is, by controlling the voltage applied to the slider 224, it is possible to control the fly height or HMS based on the electrostatic attraction due to the potential differential between the slider 224 and the disc 202. For example, as the voltage differential is increased, the electrostatic attraction between the slider 224 and the disc surface 232 increases, decreasing the fly height or HMS. The fly height is adjusted to compensate for irregularities in the topography of the disc, with the intent to have the slider 224 as close to the disc 202 as possible, without having data-destroying head-disc interaction.

The slider 224 also includes a heater 245 that, upon application of power to the heater 245, thermally physically expands a portion of the slider 224 towards the disc 202 (the expansion illustrated in phantom). Not shown in FIG. 2, the slider 224 also includes a sensor to detect when contact has been made between the slider 224 (e.g., the expanded portion of the slider) and the disc 202; data from this sensor can be used to adjust the voltage differential, e.g., by adjusting the output from the voltage source 240.

As indicated above, the voltage differential possible between the disc 202 and the slider 224 is limited by the voltage differential available from the voltage source 240 and the inherent native voltage $V_1$ and $V_2$.

Figure 3:
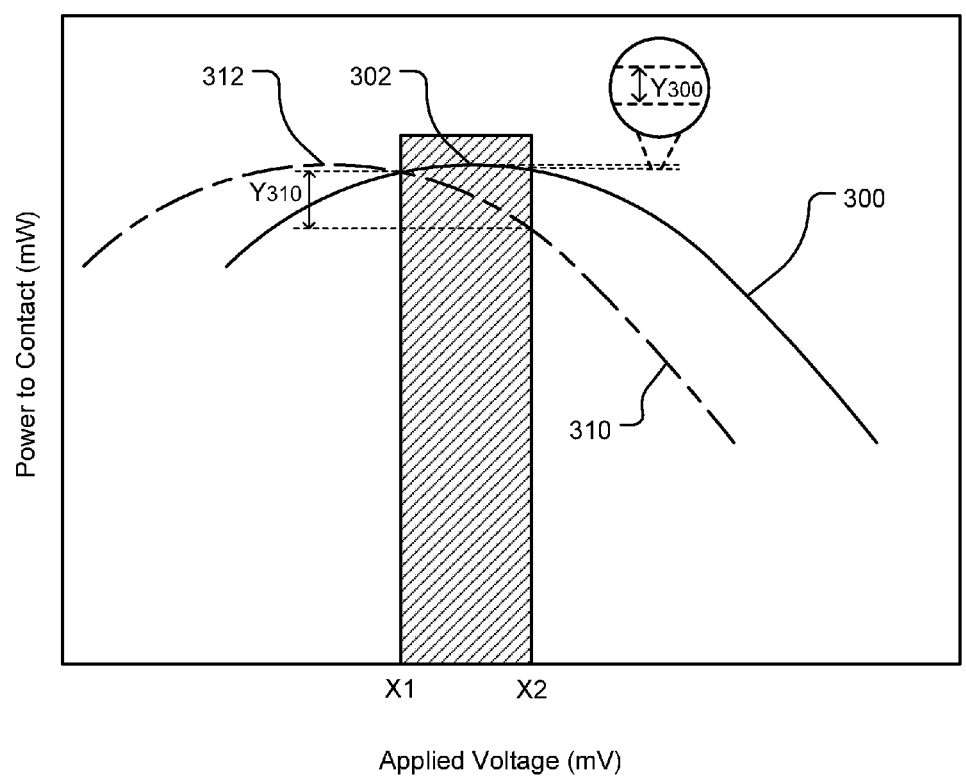
FIG. 3 is a graphical representation illustrating a shift in the power-to-contact curve due to the inclusion of a self-assembled monolayer.

FIG. 3 illustrates a generic power-to-contact curve 300 that shows an example of the power (mW) needed to be input to the heater (e.g., the heater 245 of FIG. 2), based on the voltage differential between $V_1$ and $V_2$, in order to have the slider sufficiently expand/protrude to contact the disc surface. FIG. 3 highlights an example voltage differential range available from the voltage source (e.g., voltage source 240 of FIG. 2) and the native voltage. In this implementation, the amount of voltage differential available ranges from an arbitrary X1 to X2 (typically measured in mV), which may be either negative (−) or positive (+) and may increase or decrease from X1 to X2. As can be seen from curve 300 in FIG. 3, the amount of power to the heater needed to form the protrusion to make contact with the disc surface changes with the voltage differential; however, in this particular embodiment, the power to the heater needed to make contact varies very little from X1 to X2. This difference in power, from X1 to X2, is the clearance change available to mitigate unaccounted media topography and is referred to as the "stroke." As can be seen, the stroke $Y_{300}$ available for curve 300 is fairly small, which results in a small range of unaccounted media topography that can be mitigated.

To increase the available stroke and thus obtain a larger range of media topography that can be mitigated, a self-assembled monolayer (SAM) is provided on either surface (i.e., the surface 234 of the slider or the disc surface 232). The SAM material modifies the surface potential of that surface, thus affecting the voltage differential between the surface 234 of the slider or the disc surface 232. This modified surface potential, shifts the power-to-contact curve; curve 310 is the power-to-contact curve shifted due to the presence of SAM material. Additionally, the SAM material shifts the native potential difference, which is the peak of the power-to-contact curve; for curve 300, the native potential difference is identified at 302, and for shifted curve 310 the native potential difference is identified at 312. It is noted that although in FIG. 3 the SAM shifts the curve 310 and the native potential difference 312 to the left, in other implementations, depending on the voltage source, the SAM material, and the orientation of the graph, the shift may be to the right.

It has been found that by selecting an appropriate SAM material for the voltage source, the power-to-contact curve is shifted along the x-axis, resulting in increased available stroke for the same voltage differential. For example, the stroke $Y_{300}$ associated with curve 300 (no SAMs) is substantially smaller than the stroke associated with curve 310 (with an appropriate SAMs coating). Thus, the fly height or HMS can be more readily adjusted because a broader range of media topography can be mitigated with the same voltage source. See curve 310, which has a stroke $Y_{310}$, which is significantly larger than $Y_{300}$, in this implementation about 4× larger. In other implementations, the increase may be more (e.g., 5×, 6×, etc.) or less (e.g., 2×, 3×).

In sum, FIG. 3 illustrates how by including a SAM on either surface (i.e., on the ABS surface of the slider or the disc surface), the fly height or HMS can be more readily adjusted because the power-to-contact curve can be shifted to where the available "stroke" is greater.

To increase the available stroke and thus obtain a larger range of possible protrusion or clearance change, the self-assembled monolayer (SAM) is provided on either surface (i.e., the surface 234 of the slider or the disc surface 232). The SAM material modifies the surface potential of that surface, thus affecting the voltage differential between the ABS surface 234 of the slider or the disc surface 232. This modified surface potential, in essence, increases the range of the voltage differential, thus widening the range of protrusion.

The terms "self-assembled monolayer," "SAM," and variants thereof, as used herein, refer to a thin monolayer of surface-active molecules provided (e.g., adsorbed and/or chemisorbed) on a surface to produce chemical bonds therebetween.

Any SAM coating or coatings can be applied to either the slider ABS or the disc surface. The ABS may or may not have a protective overcoat (e.g., diamond-like carbon) prior to applying the SAM material. The SAM material may be applied (coated) by any method conducive to applying SAM material onto the ABS or the protective overcoat. Similarly, the disc surface may or may not have a protective overcoat and/or lubricant present thereon prior to applying the SAM material. The SAM material may be applied (coated) by any method conducive to applying SAM material onto the disc surface.

The SAM coating is comprised of at least one SAM material. The coating can be oleophobic or oleophilic, hydrophobic or hydrophilic. The SAM material has a surface potential, which, when applied to the slider or the disc, provides that surface potential (or close to that surface potential) to the coated surface. It has been found that a SAM with a surface potential of +/−0.5 V to +/−1 V (i.e., either + or − charge) is particularly suited for use in this system, however, higher or lower surface potentials could alternately be used. For example, a SAM that has a surface potential of +/−0.1 V is usable.

Although Applicant is not aware of a correlation between surface potential and surface energy, typically, two SAM materials having different surface energy will have different potential.

The phrase "oleophilic SAM" and variations thereof as used herein refers to a SAM having an oleophilic functional end group, such as saturated hydrocarbons. Other particular examples of suitable terminal groups include alkyls with 1-18 carbon atoms in addition to other unsaturated hydrocarbon variants, such as, aryl, aralkyl, alkenyl, and alkenyl-aryl. Additionally, materials with amine terminations, as well as carbon oxygen functional groups such as ketones and alcohols, will exhibit oleophilic properties.

The phrase "oleophobic SAM" and variations thereof as used herein refers to a SAM having an oleophobic functional end group, such as halosilanes and alkylsilanes. Particular examples of suitable halosilane and alkylsilane terminal groups include fluorinated and perfluorinated. In some implementations, an oleophobic SAM is also hydrophobic, thus being amphiphobic.

Prior to application to the surface, the SAM molecules may have been present, for example, in a reaction solution or a reactive gas phase. The precursor compound for forming the SAM coating contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition, the hydrocarbons materials listed above can be functionalized with fluorine substitutions, amine terminations, as well as carbon oxygen functional groups such as ketones and alcohols, etc., depending on the desired properties of the resulting SAM coating.

SAMs are created by chemisorption of the head groups onto the surface (i.e., either the disc surface or the slider ABS surface) from either a vapor or liquid phase. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

The precursor compound of the SAM may be present in any conventionally-used organic solvent, inorganic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-hexanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

An example of a commercially available SAM is 1H,1H,2H,2H-perfluorodecyltrichlorosilane (also known as, heptadecafluoro-1,1,2,2-tetrahydro-decyl-1-trichlorosilane) [CAS: 78560-44-8], which is in the general the class of fluorinated organosilanes. Other examples include trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

Another example of a commercially available SAM is (3-aminopropyl)-trimethoxysilane [CAS: 13822-56-5], which is in the general class of organosilanes with amine, alcohol, or mercapto substituents. Other examples include (3-Mercaptopropyl)trimethoxysilane, methyl 11-[dichloro (methyl)silyl]undecanoate, acetoxyethyltrichlorosilane, and vinyltriethoxysilane.

Examples of oleophilic SAM materials fall within the general class of 1-18 carbon alkylsilanes with a hydrolyzable reactive group (e.g., F, Cl, Br, and I) and an alkoxy (e.g., methoxy, ethoxy, and propoxy) include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

In some implementations, particularly for silane-containing SAM materials, the SAM material has a carbon chain having no more than 18 carbon atoms; SAM materials having a carbon chain with 10 carbon atoms or 12 carbon atoms are examples.

The SAM material may occupy the entire ABS of the slider or only a portion thereof. In some implementations, the SAM material occupies at least 50% of the ABS, in other implementations at least 75% of the ABS. One or more SAM materials may be present on the ABS; these may be present in any pattern or may be randomly on the ABS. If multiple SAM materials are present, they may differ by any of surface potential or by chemical composition (e.g., fluorinated versus non-fluorinated).

Similarly, the SAM material may occupy the entire disc surface or only a portion thereof. In some implementations, the SAM material occupies at least 10% of the surface, in other implementations at least 25% of the disc surface, and in other implementations at least 50% of the disc surface. One or more SAM materials may be present on the surface; these may be present in any pattern or may be randomly distributed on the surface. If multiple SAM materials are present, they may differ by any of surface potential or by chemical composition (e.g., fluorinated versus non-fluorinated).

In addition to the SAM material changing the surface potential of one surface and thus adjusting the available stroke, other benefits of including the SAM material can be obtained. For example, some SAM materials, particularly fluorinated-SAMs, inhibit the accumulation of contaminants such as lube oil on the coated surface. Avoiding accumulation of lube on either the ABS or the disc improves data reading and writing efficiency and extends the life of the drive. Reducing any contaminants also allows a reduction in the HMS, further improving disc efficiency. Additionally, including the SAM material to adjust the available stroke reduces the wear on the slider and on the disc, due to less contacts and crashes of the slider into the disc.

Although the previous discussion and figures herein have been focused on using a self-assembled monolayer (SAM) to affect the surface potential of the surface, it should be understood that other surface films or treatments can alternately be used to change the surface potential of the surface. Examples of non-SAM surfaces (e.g., films or treatments) that would affect the surface potential include doped DLC (e.g., nitrogen doped, tungsten doped, chromium doped), fluorinated DLC, plasma ash etch treatment, a thin metallic film (e.g., chrome). The surface treatment should change the surface potential difference by at least +/−0.1 V (100 mV) or at least +/−0.5 V (500 mV), or at least +/−0.7 V (700 mV), or at least +/−0.75 V (750 mV); having a surface potential of at least +/−0.5 V (e.g., +/−0.5 V to +/−1 V) is particularly beneficial. In some implementations, a non-SAM surface film or treatment may be able to provide a larger native voltage differential (and thus surface potential difference shift) than a SAM, depending on the surface potential of the non-SAM surface film or treatment. This may result in a larger power-to-contact curve and/or native potential differential shift greater than provided by a SAM coating.

Various implementations for providing a self-assembled monolayer (SAM) coating on a slider or disc surface, to modify the available surface voltage potential and thus available stroke, have been described above. The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A disc drive assembly comprising:
   a disc having a surface;
   a slider having an air-bearing surface (ABS) opposite the disc surface;
   a voltage source for applying a voltage/potential across the disc and slider; and
   a surface treatment on either the ABS or the disc surface, the surface treatment providing a surface potential of at least +/−0.5 V on the ABS or disc surface and a voltage/potential across the disc and slider of at least +/−0.5 V.

2. The disc drive assembly of claim 1, wherein the surface treatment is on the ABS.

3. The disc drive assembly of claim 1, wherein the surface treatment is on the disc surface.

4. The disc drive assembly of claim 1, wherein the surface treatment provides a surface potential of at least +/−0.7 V.

5. The disc drive assembly of claim 1, wherein the surface treatment is a doped DLC.

6. The disc drive assembly of claim 1, wherein the surface treatment is a fluorinated DLC.

7. A disc drive assembly comprising:
- a disc having a surface;
- a slider having an air-bearing surface (ABS) opposite the disc surface;
- a voltage source for applying a voltage/potential across the disc and slider;
- a self-assembled monolayer (SAM) material having a surface potential of at least +/−0.1V on either the ABS or the disc surface; and
- a voltage/potential across the ABS and the disc surface of at least +/−0.5 V.

8. The disc drive assembly of claim 7, wherein the SAM material is on the ABS.

9. The disc drive assembly of claim 7, wherein the SAM material is on the disc surface.

10. The disc drive assembly of claim 7, wherein the SAM material is a fluorinated SAM.

11. The disc drive assembly of claim 7, wherein the SAM material is a fluorinated-silane SAM.

* * * * *